(12) United States Patent
Huang (10) Patent No.: US 11,406,051 B2
(45) Date of Patent: Aug. 2, 2022

(54) KEYBOARD FOR SECURE DATA ENTRY

(71) Applicant: Microchip Technology Incorporated, Chandler, AZ (US)

(72) Inventor: Eric Huang, Xiamen (CN)

(73) Assignee: Microchip Technology Incorporated, Chandler, AZ (US)

( * ) Notice: Subject to any disclaimer, the term of this patent is extended or adjusted under 35 U.S.C. 154(b) by 446 days.

(21) Appl. No.: 16/575,710

(22) Filed: Sep. 19, 2019

(65) Prior Publication Data

US 2020/0296866 A1    Sep. 17, 2020

(30) Foreign Application Priority Data

Mar. 13, 2019 (CN) .......................... 201910188334.9

(51) Int. Cl.
*H05K 9/00* (2006.01)
*H01H 13/86* (2006.01)
*G06F 3/02* (2006.01)
*G06F 3/023* (2006.01)
*G06Q 20/20* (2012.01)
*G06F 21/83* (2013.01)

(52) U.S. Cl.
CPC ......... *H05K 9/0071* (2013.01); *G06F 3/0202* (2013.01); *G06F 3/023* (2013.01); *G06F 21/83* (2013.01); *G06Q 20/206* (2013.01); *H01H 13/86* (2013.01); *H01H 2231/006* (2013.01); *H01H 2239/004* (2013.01); *H01H 2239/006* (2013.01); *H01H 2239/032* (2013.01)

(58) Field of Classification Search
CPC ..... H05K 9/0071; G06F 3/0202; G06F 3/023; G06Q 20/206; H01H 13/86; H01H 2231/006; H01H 2239/004; H01H 2239/006; H01H 2239/032
See application file for complete search history.

(56) References Cited

U.S. PATENT DOCUMENTS 3,968,488 A * 7/1976 Bovio .................... H01H 13/70
                                                           200/404
9,430,107 B2  8/2016 Hanauer et al.
9,543,948 B2  1/2017 Curtis et al.
(Continued)

OTHER PUBLICATIONS

Monaco, John V., "SoK: Keylogging Side Channels," IEEE Symposium on Security and Privacy, pp. 211-228, May 20, 2018.
(Continued)

*Primary Examiner* — Ariel A Balaoing
(74) *Attorney, Agent, or Firm* — Slayden Grubert Beard PLLC (57) ABSTRACT

A keyboard for secure data entry is provided. The keyboard comprises at least one or more of data entry buttons that can be depressed by a user. For each of the data entry buttons, a button actuator is provided that is movable upon the user depressing the respective data entry button and a primary capacitive sensor is provided that is arranged to determine movement of the button actuator of the respective data entry button by capacitance sampling. The button actuator is at least partly made from a conductive material. The button actuator is coupled to a defined electric potential at least during the capacitance sampling to shield the primary capacitive sensor from eavesdropping.

18 Claims, 5 Drawing Sheets

(56) References Cited

U.S. PATENT DOCUMENTS

| | | | |
|---|---|---|---|
| 2007/0018334 A1* | 1/2007 | Peytavy | G06K 19/07381 |
| | | | 257/659 |
| 2007/0204173 A1* | 8/2007 | Kuhn | G07F 19/207 |
| | | | 713/194 |
| 2011/0095919 A1* | 4/2011 | Ostermoller | G06F 3/0202 |
| | | | 341/33 |
| 2012/0106113 A1* | 5/2012 | Kirmayer | H05K 1/0275 |
| | | | 361/784 |
| 2012/0180140 A1* | 7/2012 | Barrowman | G06F 21/83 |
| | | | 726/34 |
| 2012/0228111 A1* | 9/2012 | Peterson | H03K 17/98 |
| | | | 200/600 |
| 2013/0090873 A1* | 4/2013 | Lundstrum | H03K 17/962 |
| | | | 700/286 |
| 2014/0253505 A1 | 9/2014 | Vincent et al. | 345/174 |
| 2014/0375481 A1* | 12/2014 | McNicoll | G06F 21/86 |
| | | | 341/27 |

OTHER PUBLICATIONS

International Search Report and Written Opinion, Application No. PCT/US/2019/055774, 12 pages, dated Dec. 19, 2019.

* cited by examiner

KEYBOARD FOR SECURE DATA ENTRY

RELATED APPLICATIONS

The present application claims priority to CN Patent Application No. 201910188334.9 filed Mar. 13, 2019, the contents of which are hereby incorporated in their entirety.

TECHNICAL FIELD

The present invention relates to the field of keyboards for secure data entry.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

In the field of computer technology, a possibility for secure and reliable entry of data is a necessity for a multitude of applications, such as in particular for authentication purposes to gain access to an electronic or a physical resource.

For example, in Point-of-Sale (POS) or building access systems, a user is often required to enter a passcode or PIN. This passcode entry needs on the one hand to be reliable to allow the user to gain access conveniently, on the other hand, security of the entry needs to be maintained. In both of the preceding examples, the respective passcode entry may be conducted in a public place. Due to that, corresponding passcode entry systems may be tampered with by a malicious third party to obtain the passcode and to gain access to the respective resource.

For example, it may be possible for a third party to try scanning the PIN entry using a so-called "side-channel attack". This traditional key array scan method allows to scan for signal changes, e.g., high/low level changes on a keypad's column and row circuit. It is relatively easy to monitor such changes using a side-channel attack that is widely available.

To solve the problem of side-channel scanning, a known solution is to protect the keypad input from being monitored by using a flexible mask with printed silver paste conductors, placed on top of a typical button dome array of the keypad. The silver paste mask is connected to internal anti-tamper pins to form an active shield mask. This solution however provides frequent bending of the silver paste mask during the assembly process and during use, which may lead to reliability problems. In addition, the cost of this kind of arrangement is quite high.

SUMMARY

The following summary of the present invention is provided to facilitate an understanding of some of the innovative features unique to the present invention and is not intended to be a full description. A full appreciation of the various aspects of the invention can be gained by taking the entire specification, claims, drawings, and abstract as a whole.

In light of the preceding discussion, a need exists to provide an improved keyboard that allows reliable, secure data entry and prevents eavesdropping by a malicious third party.

The invention, as defined in the independent claims, provides an improved keyboard for secure data entry, a point-of-sale device, and a method of secure data entry. Embodiments of the invention are discussed in the dependent claims and the following description.

According to one aspect of the present invention, a keyboard for secure data entry is provided. The keyboard comprises at least one or more of data entry buttons that can be depressed by a user, and for each of the data entry buttons, a button actuator, movable upon the user depressing the respective data entry button, and a primary capacitive sensor, arranged to determine movement of the button actuator of the respective data entry button by capacitance sampling. According to the present aspect, the button actuator is at least partly made from a conductive material, and the button actuator is coupled to a defined electric potential at least during the capacitance sampling to shield the primary capacitive sensor from eavesdropping.

According to another aspect of the present invention, a point-of-sale (POS) device is provided, comprising at least a POS transaction processor, one or more of data entry buttons that can be depressed by a user, and for each of the data entry buttons, a button actuator, movable upon the user depressing the respective data entry button, and a primary capacitive sensor, arranged to determine movement of the button actuator of the respective data entry button by capacitance sampling. The button actuator is at least partly made from a conductive material, and the button actuator is coupled to a defined electric potential at least during the capacitance sampling to shield the primary capacitive sensor from eavesdropping.

According to yet another aspect of the present invention, a method of secure data entry with a keyboard having one or more of data entry buttons that can be depressed by a user is provided. In the present aspect, for each of the data entry buttons, a button actuator, and a primary capacitive sensor is provided. The method comprises a) sampling of the primary capacitive sensor to determine movement of the button actuator, and b) at least during the sampling, coupling the button actuator to a defined electric potential to shield the primary capacitive sensor from eavesdropping.

The basic idea of the aforementioned aspects of the present invention is to provide a keyboard for secure data entry having capacitive sensors to determine if a data entry button of the keyboard is depressed by a user, which keyboard uses a button actuator of each data entry button to at least temporarily provide a shield against eavesdropping by malicious third parties. Thus, a secure data entry is possible with a highly reliable and cost-efficient setup.

The above aspects and other aspects of the invention will be apparent from and elucidated with reference to the embodiments described hereinafter.

DETAILED DESCRIPTION

Technical features described in this application can be used to construct various embodiments of keyboards for secure data entry, point-of-sale devices, and methods of secure data entry. Some embodiments of the invention are discussed so as to enable one skilled in the art to make and use the invention.

In a first exemplary aspect, a keyboard for secure data entry is provided. The keyboard comprises at least one or more data entry buttons that can be depressed by a user. For each of the data entry buttons, a button actuator is provided, which button actuator is movable upon the user depressing the respective data entry button. In addition, for each of the data entry buttons, a primary capacitive sensor is provided, arranged to determine movement of the button actuator of the respective data entry button by capacitance sampling. According to the present aspect, the button actuator is at least partly made from a conductive material, and the button actuator is coupled to a defined electric potential at least during the capacitance sampling to shield the primary capacitive sensor from eavesdropping.

The keyboard according to the present aspect may be of any suitable type. In some embodiments, the keyboard is a computer keyboard, for example a QUERTY-type keyboard. In some embodiments, the keyboard is configured as a numeric keyboard, also referred to as a numeric keypad or number pad. In some embodiments, the data entry buttons are arranged in a matrix, for example a 3×3 matrix.

As discussed in the preceding, the keyboard according to the present aspect comprises one or more data entry buttons that can be depressed by the user, i.e., that are user-operable. The data entry buttons may be of any suitable type and material, depending on the application, such as for example plastic or metal in a square or round shape. The keyboard further comprises for each data entry button, an associated button actuator that is movable upon a user operating/depressing the respective data entry button. The button actuator is at least in part made from conductive material, but otherwise may of any suitable type. In some embodiments, the button actuator is made from a metal, plastic, or a combination thereof. In some embodiments, the button actuator is dome-shaped, which allows deforming of the button actuator when a user depresses the respective button.

The keyboard according to the present aspect further comprises for each data entry button, a primary capacitive sensor. The primary capacitive sensor serves to determine movement of the button actuator of the respective data entry button by capacitance sampling, i.e., by determining a change of the capacitance of the primary capacitive sensor. It is noted that in the present context, the term "movement" with respect to the button actuator is understood broadly and includes position changes of the button actuator, but also deforming of the button actuator.

The primary capacitive sensor may be of any suitable type, various of which are known in the art. In some embodiments, the primary capacitive sensor is a mutual-capacitance sensor, as for example described in U.S. Pat. Nos. 9,543,948 or 9,430,107, the entire contents of which are incorporated herein by reference. In some embodiments, the primary capacitive sensor is a self-capacitance sensor.

According to the present aspect, the button actuator is coupled to a defined electric potential at least during the capacitance sampling of the primary capacitive sensor. This way, the button actuator, or more precisely the conductive parts of the button actuator, serve as an active shield to the primary capacitive sensor, so that eavesdropping or monitoring on the electric changes in the primary capacitive sensor in a typical side-channel attack is much more difficult.

For example, and in some embodiments, the button actuator is coupled or connected to ground potential at least during the capacitive sampling. In other embodiments, the button actuator is coupled to a potential, different from ground potential at least during capacitive sampling. In some embodiments, the button actuator is not only coupled to the defined electric potential during the capacitance sampling, but for longer periods. In some embodiments, the button actuator is coupled to the defined electric potential permanently when the keyboard is operational, i.e., powered-up.

In some embodiments, the button actuator of the respective button is coupled to the defined electric potential at least during the capacitance sampling. In some embodiments, the button actuators of all data entry buttons are coupled to the defined electric potential at least during the capacitance sampling. The latter embodiments provide a further improved shielding functionality.

In some embodiments, the keyboard may comprise additional components, such as, for example, one or more of a housing, a processor, a suitable power supply, a display, memory, credit card reader, printer, and an interface to a communications network. It is noted that in some embodiments, the keyboard, in addition to the one or more data entry buttons, may comprise one or more additional buttons, which do not comprise the button actuator and/or primary capacitive sensor as discussed in the preceding. For example, in a typical Point-of-Sale (POS) credit card terminal application, the keyboard may comprise a 3×3 matrix of (secure) data entry buttons as discussed, but also a power on/off button and a 'print' button, which may be of a typical, non-secure type.

In some embodiments, the keyboard comprises a keyboard controller, configured to control at least the capacitance sampling of the primary capacitive sensor and to couple the button actuator to the defined electric potential at least during the capacitance sampling. The keyboard controller may be of any suitable type, comprising a microcontroller or a microprocessor without limitation.

In some embodiments, each data entry button comprises a button cap that can be depressed by the user, which button cap is arranged on a first side of the respectively associated button actuator. In some embodiments, the primary capacitive sensor is arranged on a second side of the button actuator, opposite to the first side thereof.

In some embodiments, the keyboard further comprises a shield removal detection circuit to determine tampering with one or more of the button actuators. The determination of tampering in this context may comprise, without limitation, removal of one or more of the button actuators and/or the buttons. In some embodiments where the keyboard comprises button caps, the determination of tampering may further comprise a detection of a direct contact of one of the button actuators by a human or by a conductive probe, since this would be indicative of the removal of the respective plastic button cap of the button. The preceding embodiments further increase the security of the keyboard.

In some embodiments, the shield removal detection circuit is configured to erase data and/or suspend operation of the keyboard when tampering is detected. In some embodiments, a tampering indicator, such as a corresponding LED, is activated. In some embodiments, a tampering indicator message is provided to a remote server in case tampering is detected. In some embodiments, the keyboard controller is connected to the shield removal detection circuit and is configured to control the operation of the shield removal detection circuit.

The shield removal detection circuit may be of any suitable type. In some embodiments, the shield removal detection circuit comprises, for each of the data entry buttons, a secondary capacitive sensor. The secondary capacitive sensor may be of any suitable type, for example, a mutual-capacitance sensor or a self capacitance sensor. It is noted that in some embodiments, the secondary capacitive sensor may not be configured to determine, whether a button was pressed by the user, but only to determine tampering with one of the button actuators.

In some embodiments, the secondary capacitive sensor is arranged between the button actuator and the primary capacitive sensor. The present embodiments result in a very compact setup.

In some embodiments, the keyboard comprises at least one printed circuit board, which printed circuit board comprises one or more of the primary capacitive sensor and the secondary capacitive sensor. In particular and in some embodiments, the primary capacitive sensor is arranged in an intermediate layer of the printed circuit board. The latter setup further increases the reliability of the keyboard, as dust or other environmental influences do not interfere with the detection of the user's button press.

According to another aspect, a point-of-sale (POS) device is provided that comprises at least a POS transaction processor and one or more of data entry buttons that can be depressed by a user. The POS device further comprises for each of the data entry buttons a button actuator, movable upon the user depressing the respective button; and a primary capacitive sensor, arranged to determine movement of the button actuator of the respective data entry button by capacitance sampling. According to this aspect, the button actuator is at least partly made from a conductive material; and the button actuator is coupled to a defined electric potential at least during the capacitance sampling to shield the primary capacitive sensor from eavesdropping.

The POS device according to the present aspect and in further embodiments may be configured according to one or more of the embodiments, discussed in the preceding with reference to the preceding aspect. With respect to the terms used for the description of the present aspect and their definitions, reference is made to the discussion of the preceding aspect.

In some embodiments, the POS transaction processor is configured to process credit card transactions of a connected credit card reader.

According to another aspect, a method of secure data entry with a keyboard is provided. The keyboard comprises one or more of data entry buttons that can be depressed by a user; and for each of the data entry buttons, a button actuator, movable upon the user depressing the respective data entry button and being at least partly made from a conductive material; and a primary capacitive sensor. The method of this aspect comprises sampling of the primary capacitive sensor to determine movement of the button actuator; and at least during the sampling, coupling or connecting the button actuator to a defined electric potential to shield the primary capacitive sensor from eavesdropping.

The method according to the present aspect and in further embodiments may be configured according to one or more of the embodiments, discussed in the preceding with reference to the preceding aspects. With respect to the terms used for the description of the present aspect and their definitions, reference is made to the discussion of the preceding aspects. In some embodiments, the preceding method steps of sampling of the primary capacitive sensor to determine movement of the button actuator; and at least during the sampling, coupling the button actuator to a defined electric potential to shield the primary capacitive sensor from eavesdropping, are repeated during the operation of the keyboard.

Reference will now be made to the drawings in which the various elements of embodiments will be given numerical designations and in which further embodiments will be discussed.

Specific references to components, sections, parts, process steps, and other elements are not intended to be limiting. Further, it is understood that like parts bear the same reference numerals, when referring to alternate figures. It is further noted that the figures are schematic and provided for guidance to the skilled reader and are not necessarily drawn to scale. Rather, the various drawing scales, aspect ratios, and numbers of components shown in the figures may be purposely distorted to make certain features or relationships easier to understand.

As one of skill in the art will readily recognize, in the field of access control, such as for electronic payments or access to an electronic (e.g., computer access) or physical (e.g., building) resource and in particular when entering a password, it is important that the password stays secure and is only known to the authorized user(s) thereof. In the recent past, malicious third parties have tried to obtain personal identification numbers (PINs) from point-of-sale (POS) credit card terminals by placing a "scanner" close to the terminal, which scanner traces low/high signal changes of a keypad's column and row circuits. In the following, an exemplary POS device 1 will be described in more detail that comprises a keyboard for secure data entry and that reduces the chance of a successful scanning attack by a malicious third party.

Figure 1:
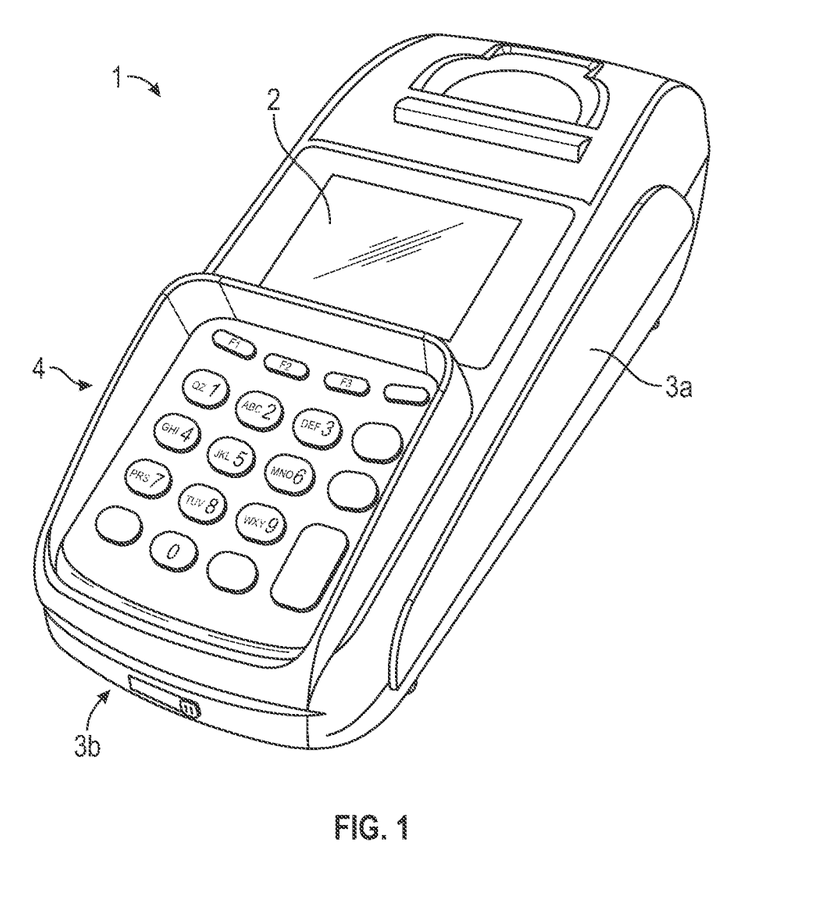
FIG. 1 shows a first embodiment of a point-of-sale (POS) device.
Figure 2:
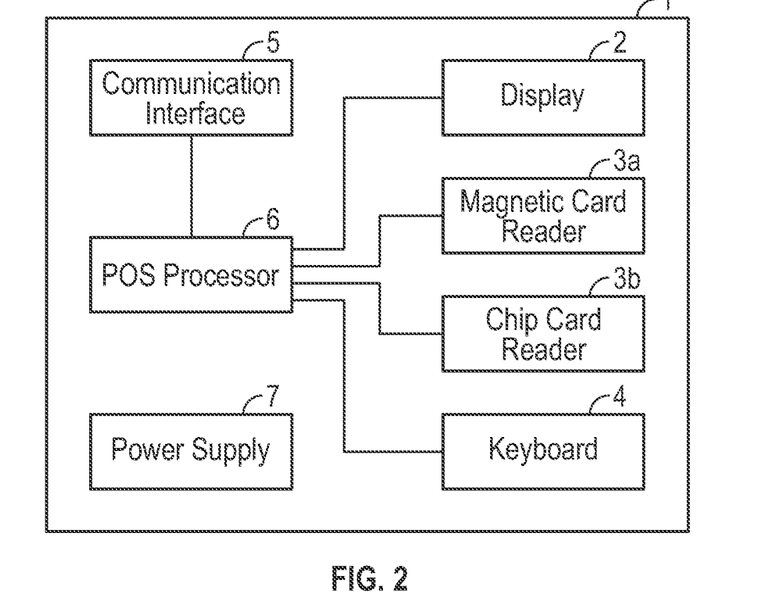
FIG. 2 shows a schematic block diagram of the POS device according to the embodiment of FIG. 1.

FIG. 1 shows a first embodiment of a point-of-sale (POS) device/system 1, i.e., a POS credit card/debit card processing terminal. The POS device 1 comprises a display 2, a magnetic card reader 3a, a chip reader 3b, and in particular, a keyboard 4 for secure data entry. FIG. 2 shows a schematic block diagram of the POS device 1, which shows further components, namely a communication interface 5, POS processor 6, and power supply 7. The POS processor 6 controls the operation of the POS device 1 and comprises a microprocessor and memory, the latter comprising firmware, i.e., software to provide transaction processing functionality of the POS device 1. The communication interface 5 is a wired/wireless LAN Ethernet interface for connection to a private or public network and serves, corresponding to typical POS device 1, to transmit transaction data to and to obtain an authorization for the respective transaction from a remote transaction processing server. The POS device 1 further comprises a power supply 7 for providing operating power to all other components of the device 1. So as not to obscure the drawing, connections from and to the power supply 7 have been omitted in FIG. 2.

Figure 3:
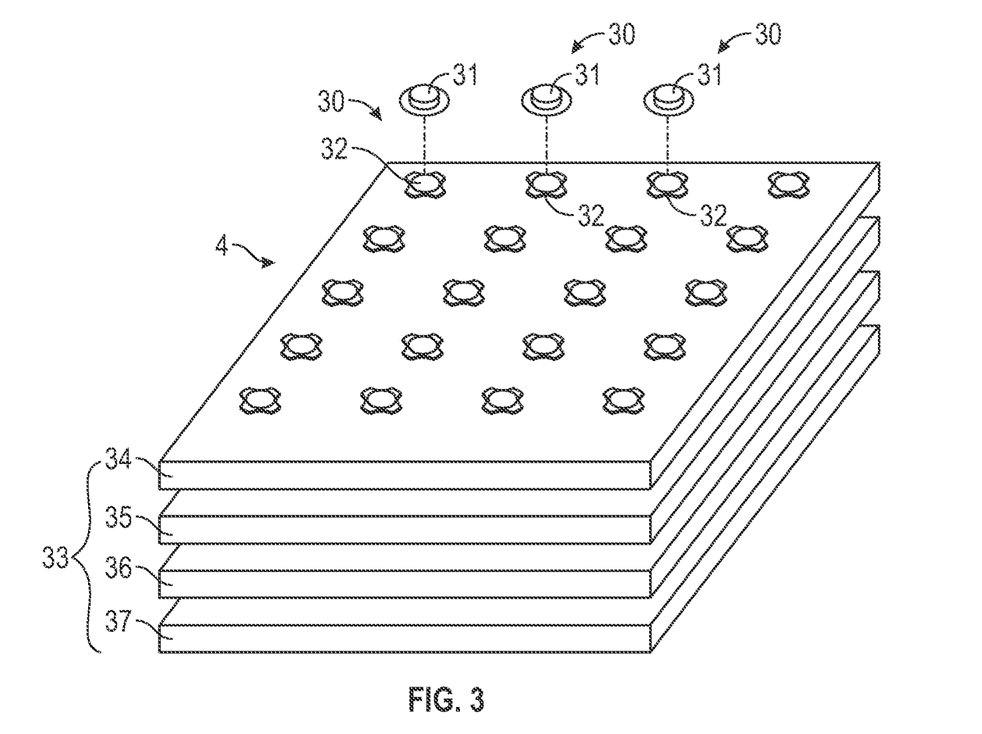
FIG. 3 shows a partial, exploded view of an embodiment of a keyboard.

In the following, the setup of keyboard 4 is discussed in detail. A partial, exploded view of the keyboard 4 is shown in FIG. 3. As shown in the drawing, the keyboard 4 comprises a plurality of data entry buttons 30, each comprising a plastic button cap 31 and a button actuator 32. Button actuator 32 in the present embodiment is dome-shaped and made of metal. The button actuator 32 is deformable when a user exerts force on it, i.e., upon depressing the respective data entry button 30 and is used to indicate that the respective button has been depressed. Button actuator 32 also acts as a spring so that the data entry button 30 returns to its original position when the user's force is removed.

The keyboard 4 further comprises a multi-layer printed circuit board (PCB) 33. An intermediate layer 35 of the PCB comprises a plurality of primary capacitive sensors 40, i.e., one sensor 40 per button 30. The primary capacitive sensors 40 are used to detect whether the user has depressed the respective data entry button 30 by capacitive sampling. The primary capacitive sensors 40 are mutual-capacitance sensors.

Figure 4:
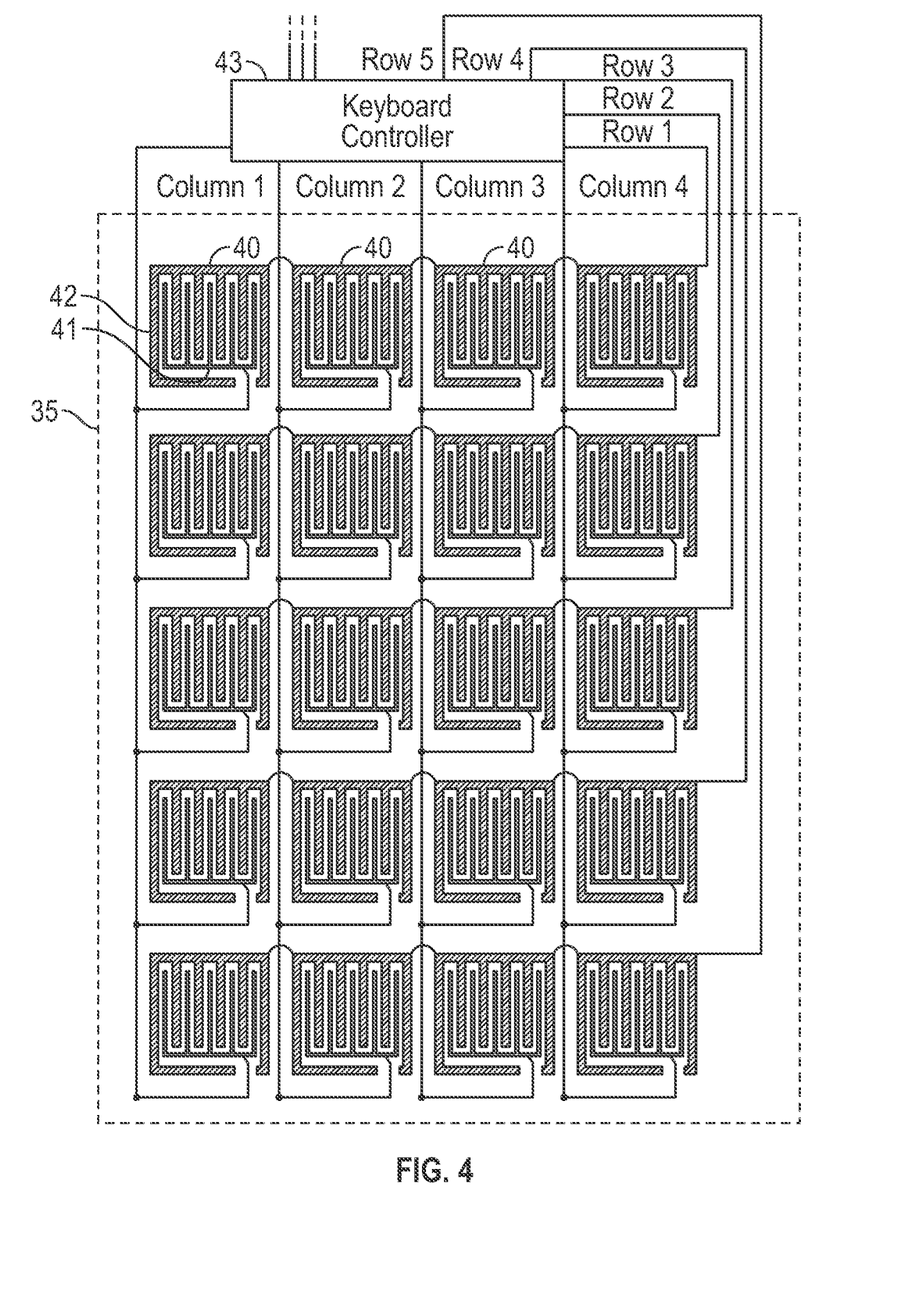
FIG. 4 shows a schematic top-view of an intermediate PCB layer of the keyboard of the embodiment of FIG. 3.

FIG. 4 shows a schematic top-view of the intermediate PCB layer 35. Each primary capacitive sensor 40 comprises a transmission (TX) node 41 and a reception (RX) node 42, which are connected with a keyboard controller 43 in a row/column setup. It is noted that the keyboard controller 43 is placed on the lowest PCB layer 37, which will be discussed in detail in the following with reference to FIG. 6.

The keyboard controller 43 during capacitive sampling generates a pulsed electric field between the transmission node 41 and the reception node 42 of each primary capacitive sensor 40 and determines over multiple pulses, whether the electric field has changed. The electric field between the TX node 41 and RX node 42 in the present embodiment is influenced by the metallic button actuator 32. If the actuator 32 is deformed by a user depressing the respective data entry button 30, the electric field in the associated primary capacitive sensor 40 will change, indicating that the button 30 was pressed by the user to the keyboard controller, which in turn provides corresponding information to POS processor 6.

The signal change of mutual-capacitive sensors 40 upon a user pressing a button 30 is relatively small, compared to prior art keyboards using electric contacts. Thus, the possibility to monitor the signal change by a malicious third party is reduced. In addition, the present setup provides a key depression detection that does not rely on an electrical contact to be closed and opened, which provides a highly reliable setup, irrespective of environmental conditions, such as the presence of dust, moisture, etc., which may be problematic in a keyboard using electric contacts.

To further reduce the possibility of eavesdropping on the internal signals of the keyboard 4, the keyboard controller 34 couples the metallic button actuators 32 to ground potential during the capacitive sampling of the primary capacitive sensors 40. The metallic button actuators 32 thus form an active shield for the primary capacitive sensors 40.

Figure 5:
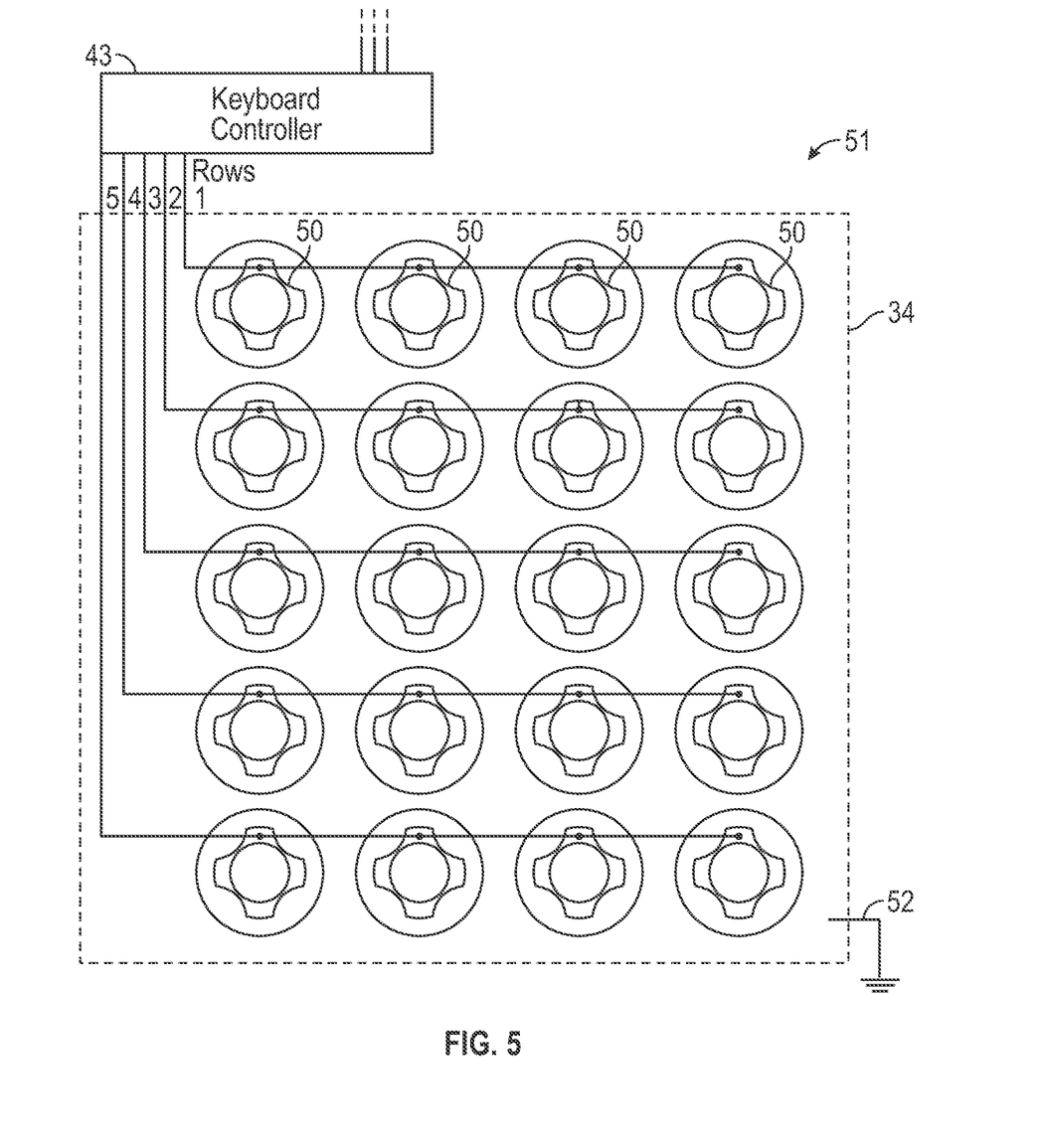
FIG. 5 shows a schematic top-view of a top PCB layer of the keyboard of the embodiment of FIG. 3.

A further active shielding function is provided by top PCB layer 34, which is shown in a schematic top view in FIG. 5. PCB layer 34 comprises secondary capacitive sensors 50, which in the present embodiment are formed as self-capacitive sensors 50. The purpose of the secondary capacitive sensors 50 is two-fold. On one hand, the secondary capacitive sensors 50 provide additional shielding for the primary capacitive sensors 40. On the other hand, the secondary capacitive sensors 50 together with button actuators 32 form part of a shield removal detection circuit 51 to allow a determination, whether the device 1 has been tampered with, e.g., whether the metallic button actuators 32 that shield the primary capacitive sensors 40 have been touched or removed.

The secondary capacitive sensors 50 are arranged on the top of the primary capacitive sensors 40 and are connected to keyboard controller 43 in five rows for cost-saving reasons. This is possible, since, as discussed in the preceding, the secondary capacitive sensors 50 are not designed to determined which button 30 is depressed by the user, but to monitor if any button 30 has been tampered with, such as by removing button actuator 32 or top PCB layer 34 by a malicious person. The secondary capacitive sensors 50 also determine if the button actuators 32 have been touched directly by a human or by a conductive probe, both of which are indicative that the button caps 31 have been removed.

Figure 7:
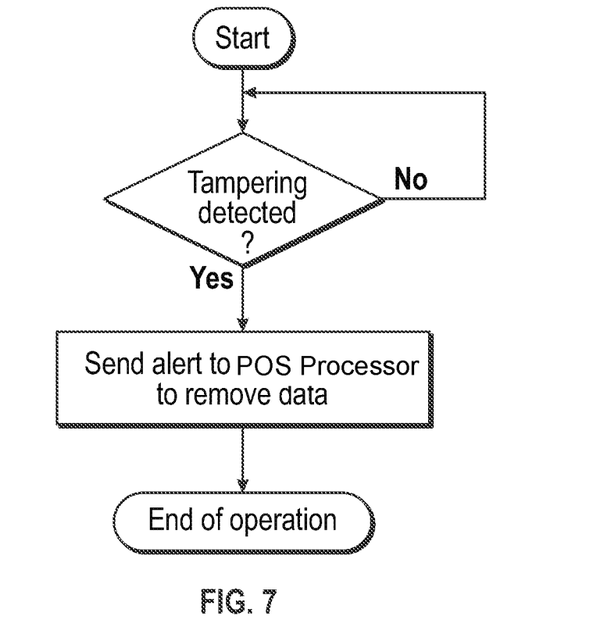
FIG. 7 shows a flow chart of the operation when tampering is detected.

The secondary capacitive sensors 50 and the primary capacitive sensors 40 are sampled in turn by the keyboard controller 43. During the capacitive sampling of the primary capacitive sensors 40, the button actuators 30, via the secondary capacitive sensors 50 are controlled to ground potential. During the capacitive sampling of the secondary capacitive sensors 50, i.e., in normal operation, it is determined, whether a button actuator 32 is removed. It is noted, that the secondary capacitive sensors 50 are not used to determine if the user presses on the button cap 31. Instead, a signal change is determined, when the button actuator 32 is removed, or as mentioned, when the button actuator 32 is touched directly. In these cases, the keyboard controller 43 will stop capacitive sampling and send an alert to POS processor 6 to remove secure data in the POS processor 6 and inform the remote transaction processing server of the evident tampering, as can be seen from the flow chart of FIG. 7.

As shown in FIG. 5, the top PCB layer 34, i.e., the area outside of the secondary capacitive sensors 50, is connected to ground 52. PCB layer 34 may comprise a continuous metallization or, e.g., a "hash-type" metallization, for a further improved shielding of the primary capacitive sensors 50. A corresponding metallization is present on the bottom intermediate PCB layer 36 for additional shielding.

Figure 6:
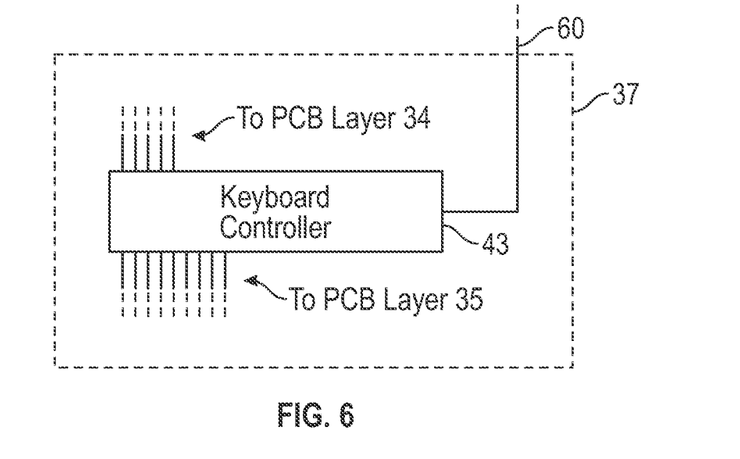
FIG. 6 shows a schematic top-view of a bottom PCB layer of the keyboard of the embodiment of FIG. 3.

FIG. 6. shows a schematic top view of the bottom PCB layer 37. As discussed in the preceding, layer 37 comprises the keyboard controller 43 and comprises various connections to PCB layers 34 and 35 as well as to POS processor 6 using bus connection 60. Not shown in FIG. 6 are power and miscellaneous connections.

Figure 8:
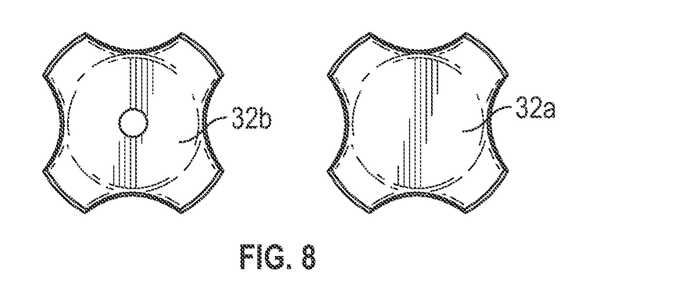
FIG. 8 shows embodiments of a button actuator for the keyboard of FIG. 3.

FIG. 8 shows alternate embodiments for button actuator 32, marked with reference numerals 32a and 32b. The setup of button actuator 32b will prevent the flat part of the actuator to approach the surface of the PCB 34, resulting in less field change when the button actuator is depressed. This setup provides a further improved resistance to eavesdropping.

The benefits of the described embodiment include a) an increased security against eavesdropping by using mutual-capacitance sensors, resulting in a relatively small signal change when a button is depressed by a user, b) insensitivity of the arrangement to environmental conditions, in particular to dust, c) improved reliability as no electric contacts are used for determining if a button is depressed, d) reduced cost compared to prior art designs using a silver paste mask, and e) employment of button actuators, acting as a spring to provide haptic feedback to the user.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment in which:

(1) mutual-touch and self-touch sensors are combined to form a secure keypad for a POS, resource (electronic or physical) access application;
(2) mutual-touch sensors are embedded in an intermediate PCB layer, arranged under every individual plastic button and the mutual-touch sensors are designed to sample the minor mutual capacitor change between a TX and a RX line;
(3) metal dome button actuators are coupled to GND when sampling the mutual capacitor sensors and when a user presses the plastic part of a button, this leads to the distortion of the metal dome, and the distortion of the metal dome will lead to a change of distance between the center part of the metal dome and the PCB surface, which in turn causes a mutual capacitor change that is sampled in this embodiment;
(4) self-touch sensors cover the top of every individual mutual touch sensor and the self-touch sensors are divided into several groups;
(5) the self-touch sensors are not designed to determine which button is pressed by the user, but to monitor if any keypad had been uncovered or touched by a person;
(6) self-touch sensors and mutual sensors are sampled in turn and in normal operation, the self-touch senor will not lead to self-signal change when user presses on the top of the plastic part of the button;
(7) when the self-sensor detects a signal change (i.e., touch or anti-touch signal), the touch controller will stop the mutual touch sample timing, and send an alert to a main controller to remove secure data in the POS; and/or
(8) a self-sensor pad is in contact with the metal dome to form a self-sensor when in self sampling and/or coupled to GND when in mutual sampling.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A keyboard for secure data entry, comprising at least one or more of data entry buttons that can be depressed by a user; and for each of the data entry buttons
a button actuator, movable upon the user depressing the respective data entry button; and
a primary capacitive sensor, arranged to determine movement of the button actuator of the respective data entry button by capacitance sampling; wherein
the button actuator is at least partly made from a conductive material; and the button actuator is coupled to a defined electric potential at least during the capacitance sampling to shield the primary capacitive sensor from eavesdropping.

2. The keyboard of claim 1, wherein the primary capacitive sensor is a mutual-capacitance sensor.

3. The keyboard of claim 1, further comprising a shield removal detection circuit to determine tampering with one or more of the button actuators.

4. The keyboard of claim 3, wherein the shield removal detection circuit is configured to erase data and/or suspend operation of the keyboard when tampering with one or more of the button actuators is determined.

5. The keyboard of claim 3, wherein the shield removal detection circuit comprises, for each of the data entry buttons, a secondary capacitive sensor.

6. The keyboard of claim 5, wherein the secondary capacitive sensor is arranged between the button actuator and the primary capacitive sensor.

7. The keyboard of claim 5, wherein the secondary capacitive sensor is a self-capacitive sensor.

8. The keyboard of claim 1, further comprising at least one printed circuit board, comprising one or more of the primary capacitive sensor and the secondary capacitive sensor.

9. The keyboard of claim 8, wherein the primary capacitive sensor is arranged in an intermediate layer of the printed circuit board.

10. The keyboard of claim 1, wherein the button actuator is dome-shaped.

11. The keyboard of claim 1, wherein the button actuator is made from metal.

12. The keyboard of claim 1, comprising multiple data entry buttons, arranged in a matrix.

13. The keyboard of claim 12, wherein the multiple data entry buttons are arranged to form a numeric keypad.

14. The keyboard of claim 1, further comprising a keyboard controller, configured to control at least the capacitance sampling of the primary capacitive sensor and to couple the button actuator to the defined electric potential at least during the capacitance sampling.

15. The keyboard of claim 1, wherein the defined electric potential is ground.

16. A point-of-sale device comprising at least
a point-of-sale transaction processor;
one or more of data entry buttons that can be depressed by a user; and
for each of the data entry buttons
a button actuator, movable upon the user depressing the respective button; and
a primary capacitive sensor, arranged to determine movement of the button actuator of the respective data entry button by capacitance sampling; wherein
the button actuator is at least partly made from a conductive material; and
the button actuator is coupled to a defined electric potential at least during the capacitance sampling to shield the primary capacitive sensor from eavesdropping.

17. A method of secure data entry with a keyboard having one or more of data entry buttons that can be depressed by a user; and for each of the data entry buttons, a button actuator, movable upon the user depressing the respective data entry button and being at least partly made from a conductive material; and a primary capacitive sensor;
wherein the method comprises sampling of the primary capacitive sensor to determine movement of the button actuator; and at least during the sampling, coupling the button actuator to a defined electric potential to shield the primary capacitive sensor from eavesdropping.

18. The method of claim 17, wherein the keyboard is configured according to claim 1.

\* \* \* \* \*